United States Patent [19]

DeLand

[11] Patent Number: 4,834,423
[45] Date of Patent: May 30, 1989

[54] QUICK CONNECT FLUID FITTING ASSEMBLY

[75] Inventor: Daniel L. DeLand, Millington, Mich.

[73] Assignee: Schmelzer Corporation, Flint, Mich.

[21] Appl. No.: 173,926

[22] Filed: Mar. 28, 1988

Related U.S. Application Data

[63] Continuation-in-part of Ser. No. 136,771, Dec. 22, 1987.

[51] Int. Cl.⁴ .................................................. F16L 37/00
[52] U.S. Cl. ...................................... 285/39; 285/319; 285/921; 285/317
[58] Field of Search ................ 285/39, 305, 307, 308, 285/317, 319, 321, 921, 216

[56] References Cited

U.S. PATENT DOCUMENTS

| | | | |
|---|---|---|---|
| 4,508,369 | 4/1985 | Mode | 285/39 |
| 4,593,943 | 6/1986 | Hama et al. | 285/308 |
| 4,610,284 | 9/1986 | Bartholomew | 285/921 |
| 4,630,848 | 12/1986 | Twist et al. | 285/308 |
| 4,679,827 | 7/1987 | Law | 285/921 |
| 4,691,943 | 9/1987 | Deland et al. | 285/308 |

FOREIGN PATENT DOCUMENTS

| | | |
|---|---|---|
| 2307154 | 8/1974 | Fed. Rep. of Germany . |
| 281086 | 12/1970 | U.S.S.R. . |
| 1024537 | 3/1966 | United Kingdom . |

Primary Examiner—Randolph A. Reese
Assistant Examiner—Anthony Knight
Attorney, Agent, or Firm—Harness, Dickey, Pierce

[57] ABSTRACT

A quick-connect fitting or coupling assembly is adapted for releasably connecting and disconnecting a pair of fluid conduits in fluid communication with one another. The assembly includes a socket on one of the fluid conduits for receiving the other fluid conduit inserted longitudinally therein into a releasable interlocking engagement with one or more resilient barbs or retainer finger members on a retainer member removably disposed within the socket. The assembly also preferably includes lateral support members for laterally supporting the fluid conduits relative to one another and thus strengthening the connection therebetween. The assembly also includes a feature in which the retainer member is interconnectable with the socket in a releasable interlocking engagement, preferably by way of one or more resilient locking finger members that are resiliently biased laterally outwardly with tabs that engage complementary openings in the socket member when the retainer member is inserted into the socket member. A release member is also provided for selective slidable engagement with the resilient retainer finger members in order to release the inserted fluid conduit from the retainer member.

21 Claims, 3 Drawing Sheets

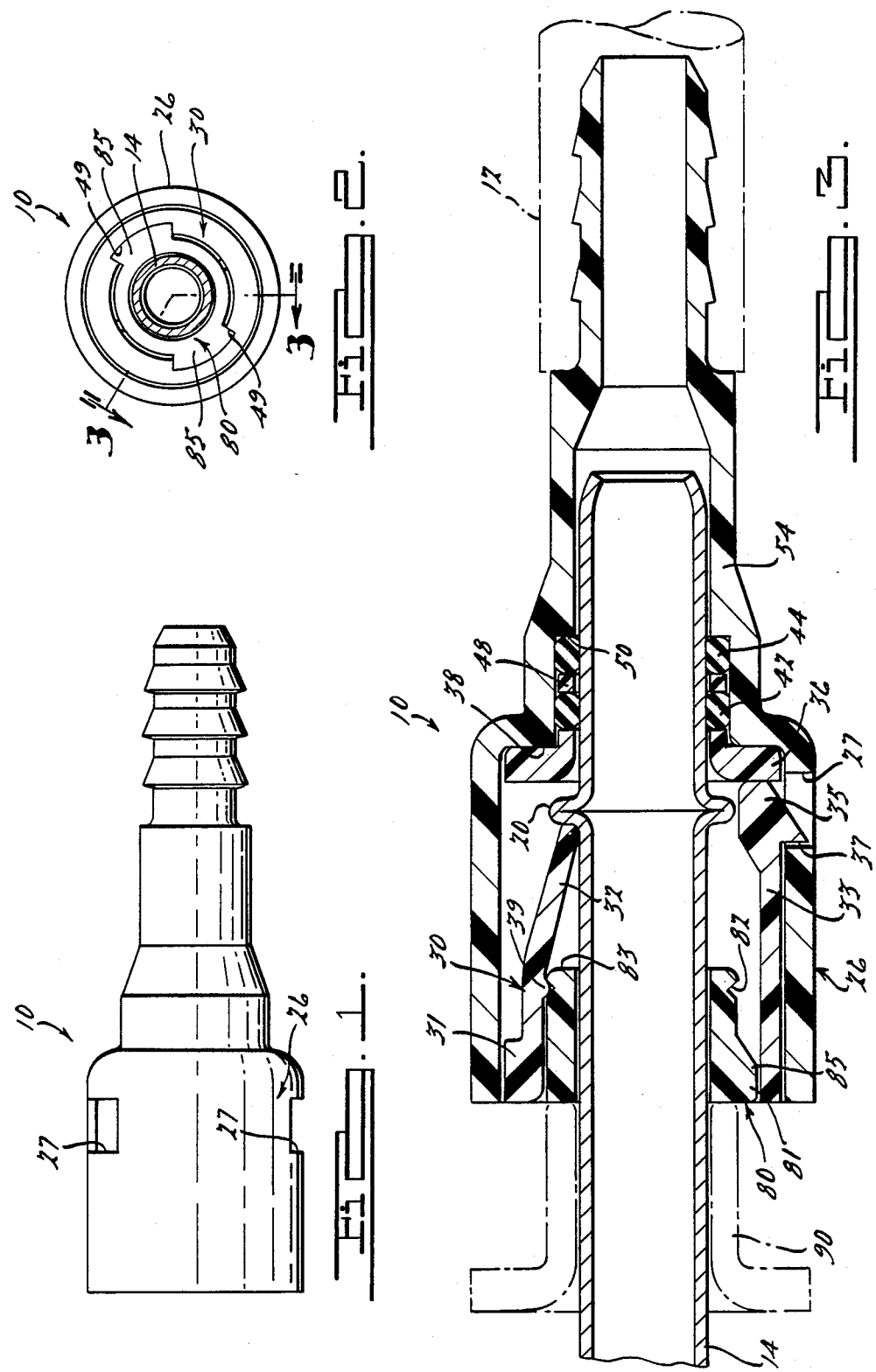

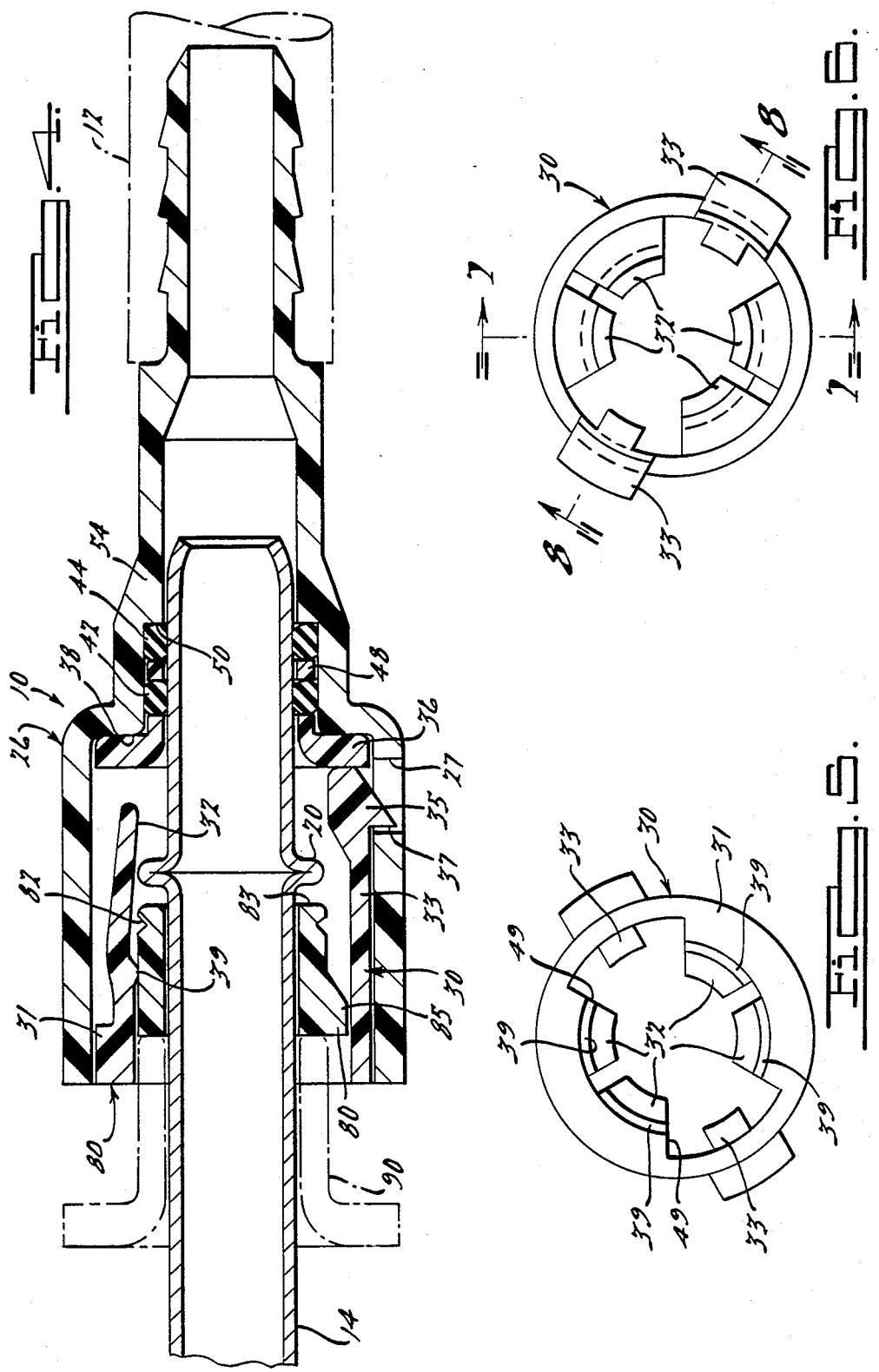

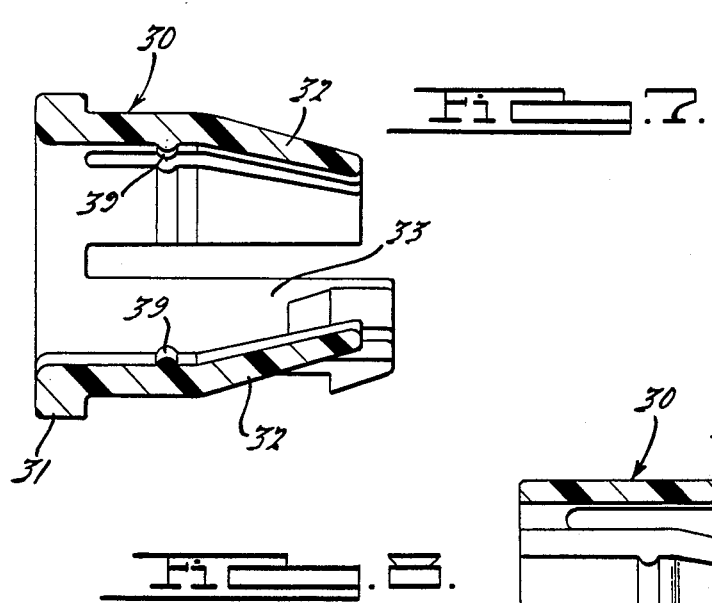
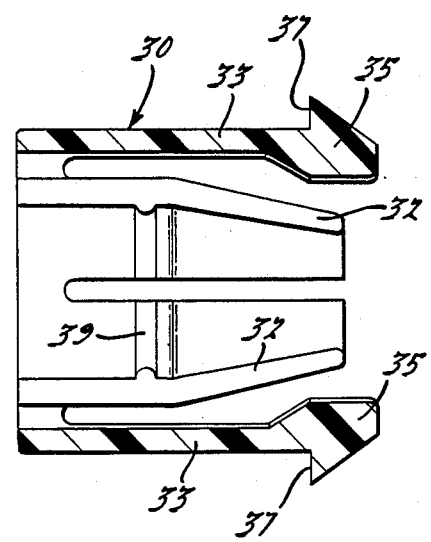
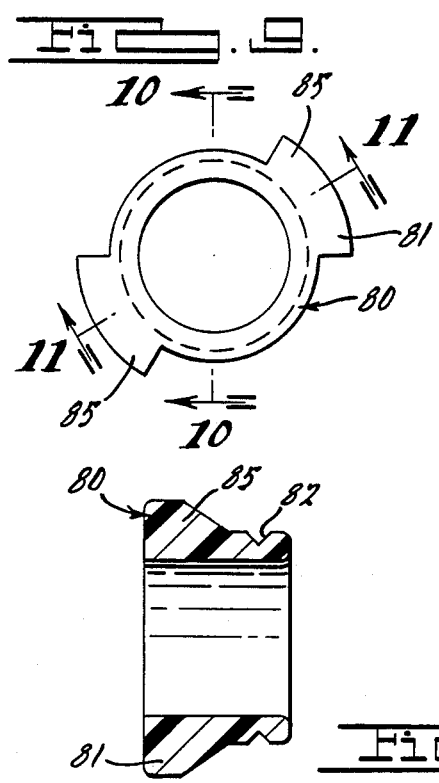
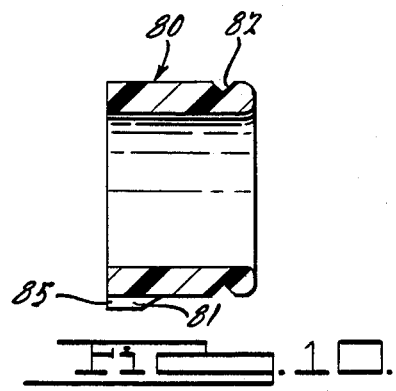

QUICK CONNECT FLUID FITTING ASSEMBLY

BACKGROUND OF THE INVENTION

This is a continuation-in-part of a copending U.S. patent application, Ser. No. 136,771, filed Dec. 22, 1987, entitled QUICK CONNECT FLUID FITTING ASSEMBLY. Such copending application is assigned to the same assignee as the present invention and is thus hereby incorporated by reference.

The invention relates generally to fluid conduit fitting or coupling devices. More particularly, the invention relates to fluid conduit fittings or couplings adapted for quickly and conveniently connecting or disconnecting a pair of fluid conduits.

A wide variety of fluid conduit fittings and couplings have been provided in the prior art for connecting conduits in fluid communication with one another. One type of such previously-known couplings includes an external generally U-shaped staple or spring clip that is inserted into generally lateral openings in an assembled fitting or coupling in order to interlockingly connect the components of the assembly to one another. Frequently, however, such staples or clips become misplaced or permanently deformed as a result of repeated assembly and disassembly of the coupling and are therefore rendered unusable and must be replaced. Additionally, such staples or clips frequently protrude outwardly away from the fitting or coupling assembly where they can snag on, or interfere with, other adjacent components in an apparatus or system. Finally, in high pressure applications, such staples or clips are often required to be very stiff and are thus difficult to install and remove from the fluid coupling or fitting.

Other prior art fittings or couplings require the use of an external clamp or ring that compresses one of the fluid conduits onto a nipple-like structure and are very time-consuming to install or remove during connection or disconnection of fluid conduits. Like the staples or clips described above, these external clamps or rings often become misplaced or permanently damaged during assembly and disassembly of the fluid conduit joint and therefore must be frequently replaced.

Still other prior art fitting or coupling assemblies include collars or sleeve-like members that are interlockingly interconnectable and disconnectable with one another in order to sealingly connect or disconnect a pair of fluid conduits. Although such fitting or coupling assemblies overcome many of the disadvantages of the prior art devices described above by having the collars or sleeves retained on the fluid conduits even when disconnected, they frequently do not provide adequate lateral support for the fluid conduits being connected to one another, thus resulting in a relatively weak connection that is susceptible to leakage or that can lead to physical damage to the conduits.

Still other well-known fitting or coupling assemblies include male and female elements that are threadably connectable to one another, but are cumbersome and time-consuming to connect or disconnect. These types of couplings are also susceptible to leakage, thereby requiring the application of sealing compounds or tape-type sealants to the threads each time the coupling elements are connected to one another. These types of couplings often cannot be used in confined areas due to the space required to tighten or loosen the threaded connections with a wrench or other tool during connection and disconnection.

Still other prior art fittings include interlockingly connectable threaded collars surrounding the fluid conduits and seals. In addition to being unusable in confined areas, these types of couplings have the disadvantage of being sensitive to relatively small variations in installation torque. If such threaded collars are not sufficiently tightened, leakage can result, but excessive torque may cause excessive compression of the seal members, which can result in accelerated deterioration of elastomeric seals.

Still other prior art coupling assemblies incorporate an expandable clip which, when inserted expands inside a threaded nut thereby locking the fluid conduits together. The nut in this type of coupling must be removed to disconnect the coupling. The use of this type of coupling is therefore limited to unconfined areas where there is sufficient space to use wrenches or other such tools during connection and disconnection. A further disadvantage of this coupling is that sealing and latching members are usually loosely assembled around one of the fluid conduits, making them susceptible to being dislodged or lost during shipping or handling, both prior to coupling and after disassembly.

Still other prior art couplings include resilient lugs on a fitting secured to a first fluid conduit to grip a semi rigid hose, in a push-connect type of assembly. This type of coupling is suited only to applications where fluid pressures are relatively low and a high degree of seal integrity is not required. These types of connectors rely on penetration of the lugs into the surface of the hose to secure the connection. Of necessity, therefore, the hose must be relatively soft and the lugs must be relatively hard. Such push-connect coupling assemblies also suffer from the disadvantage of the hose being susceptible to damage during connection and disconnection. As a result, this type of connection tends to be unreliable and is unsuited in applications where repeated connections and disconnections are anticipated, as well as in applications where relative rotation of the fluid conduits can result in the hard lugs cutting through the relatively soft hose, thus requiring removal of the damaged hose end prior to reconnection.

The above-mentioned push-connect fittings are also not well suited for connection of metal conduits as the lugs are unable to penetrate the hard tube. In addition, an abutment member is relied upon to limit the inward deflection of the lugs, and therefore such fittings are not adaptable for use with a conduit having a protuberance adapted for engagement by the lugs. Of necessity, there must be sufficient clearance for such a protuberance to pass between the lugs and the abutment, thus negating the deflection-limiting effect of the abutment.

Some push-connect couplings are provided with a clip on a fitting of a first fluid conduit having multiple lugs or fingers for engaging a protuberance on a second fluid conduit. It is also common to provide a removal sleeve member that, when pushed inward, expands the lugs or fingers in order to allow the coupling to be disconnected. Many of such fittings lack adequate means to limit the inward stroke of the removal sleeve in order to avoid excessive deflection of, and possible damage to, the lugs or fingers and to avoid the potential for the removal sleeve to become stuck in the inward poosition. These couplings also lack adequate means to laterally guide the removal sleeve during inward movement, thus making lateral movement possible. Such lateral movement, which can be caused by off-center application of assembly force, can lead to mispositioning of the removal sleeve and resultant sticking in the inward position. Many of these couplings also lack a means to return the removal sleeve to the outward position after disassembly, while others rely on auxiliary springs to perform this function.

It is common in couplings of the push-connect type to provide a retainer for the O-ring seal or seals to prevent them from being forced out of the fitting by fluid pressure with the conduits. In many couplings, the outward force on the O-ring seals caused by such pressure pushes against the retainer, which in turn pushes against the protuberance on the above-mentioned second fluid conduit and thus transmits the load into the latch or coupling mechanism. While it is also common to install the retainer into the fitting by means of a press fit, the force exerted on the O-ring can dislodge the retainer, especially where thin-walled housings, which expand under pressure, are used. Once dislodged, this type of coupling can leak or burst.

Accordingly, it is one of the objects of the present invention to provide an improved fitting or coupling assembly especially adapted for quickly, conveniently and releasably connecting a pair of fluid conduits in fluid communication with one another.

Another object of the present invention is to povide a quick-connect fitting or coupling assembly that includes a minimum of separate or loose components that can be misplaced or damaged during repeated connection and disconnection of a pair of fluid conduits.

Still another object of the present invention is to provide a quick-connect fitting or coupling assembly that avoids excessive deflection of the fingers of a latch clip, or other such retainer member during disassembly or disconnection, as well as optionally providing for assembly or connection, and for disassembly or disconnection, in confined spaces.

In accordance with the present invention, a quick-connect fitting assembly for releasably connecting a pair of fluid conduits in fluid communication with one another includes a socket on one of the fluid conduits for receiving the other fluid conduit inserted longitudinally inwardly into the socket. The inserted fluid conduit has a generally laterally-extending protuberance thereon, and a retainer member or latch clip within the fluid socket includes one or more resilient retainer finger or barb members that act similar to cantilevered members and are resiliently deflectable into a longitudinally interlocking engagement with the protuberance on the inserted fluid conduit. The action of the finger or barb members keeps insertion force to a minimum, as well as providing a "positive feel" during insertion.

Lateral support is preferably provided both at the outward end of the fitting assembly and at the inner end of the inserted fluid conduit for supporting the inserted fluid conduit relative to the socket and the remainder of the fitting assembly. In a preferred embodiment, the above-mentioned latch clip or retainer member contributes to such lateral support and also helps to present foreign material from entering the socket and inhibiting proper operation of the fitting assembly.

In the preferred embodiment of the invention, the latch clip or retainer member extends at least partially into the socket, with a collar portion of the retainer member disposed between the socket and a collar portion on a release member inserted within the retainer member and generally surrounding the inserted fluid conduit so that the collar portions laterally support the inserted fluid conduit. Also in the preferred embodiment, the outer end of the latch clip or retainer member and the release member are substantially flush with the end of the surrounding socket to serve the above-mentioned function to deterring the entry of dust or foreign objects, as well as to minimize interference with other components.

Preferably the retainer member is releasably inserted within the socket and includes at least one of the above-mentioned resilient retainer finger members disposed within the socket and resiliently deflectable into a releasable longitudinally interlocking engagement with the protuberance on the inserted fluid conduit when the second fluid conduit is fully inserted into the socket means. The retainer member also includes at least one resilient locking finger member disposed within the socket, with the lcoking finger having a laterally outwardly-protruding tab portion thereon. The locking finger members are laterally resiliently biased into a releasable, longitudinally interlocking engagement between the socket and the retainer member with the tab portion on each locking finger being releasably received in a complementary opening extending laterally through a lateral side of the socket member.

The resilient locking finger members mentioned above are selectively, resiliently deflectable in a laterally inward direction in order to selectively disengage the tab portions from within the laterally-extending openings in the socket member, thereby disengaging the retainer means from its longitudinal interlocking engagement with socket means, if desired. Such disengagement of the retainer member from within the socket is prevented, however, when the inserted fluid conduit is fully inserted into the assembly by way of a lateral abutting engagement between the protuberance on the inserted fluid conduit and the tab portions of the locking finger members.

The above-mentioned release member is releasably and slidably insertable in a longitudinal direction within the retainer member and is abuttingly engageable with the above-mentioned retainer finger members in order to selectively urge them out of their retaining abutting engagement with the protuberance on the inserted fluid conduit. Preferably, one or the other of the release member and the retainer member has a bead portion thereon, while the other of the release member and the retainer member has a complementary groove portion therein. The bead portion and the groove portion are mutually engageable and disengageable with one another, in a releasable snap-in and snap-out relationship, respectively, in order to releasably and selectively longitudinally interlock the release member and the retainer member with one another. Such an arrangement allows the release member to be selectively removed from the socket portion of the fitting assembly, thus allowing the inserted fluid conduit to be removed from the fitting assembly without withdrawing the retainer member from the socket.

In addition to the above, in the preferred arrangement of the fitting assembly according to the present invention, one or the other of the release member and the retainer member has at least one laterally-extending, generally wedge-shaped opening therein, with the other of the release member and the retainer member having at least one laterally-extending, generally wedge-shaped protuberance thereon. The wedge-shaped protuberance is thus longitudinally slidably receivable within the wedge-shape opening in order to releasably and selectively interlock the release member and the retainer member circumferentially with one another.

Additional objects, advantages and features of the present invention will become apparent from the following description and the appended claims, taken in conjunction with the accompanying drawings.

BRIEF DESCRIPTION OF THE DRAWINGS

FIG. 1 is an overall side view of the socket member portion of a quick-connect fitting assembly according to the present invention FIG. 2 is an outer end view of one preferred embodiment of a quick-connect fitting assembly according to the present invention.

FIG. 3 is a longitudinal cross-sectional view of the fitting assembly of FIG. 2, taken generally along line 3—3 of FIG. 2.

FIG. 4 is a longitudinal cross-sectional view similar to FIG. 3, but showing one of the fluid conduits being inserted (or removed) into the fitting assembly.

FIG. 5 is an outer end view of the preferred retainer member or latch clip of the present invention.

FIG. 6 is an inner end view of the preferred retainer member or latch clip of the present invention.

FIG. 7 is a longitudinal cross-sectional view of the preferred retainer member or latch clip of the present invention, taken along line 7-7 of FIG. 6.

FIG. 8 is a longitudinal cross-sectional view similar to that of FIG. 7, but taken along line 8—8 of FIG. 6.

FIG. 9 is an outer end view of the preferred release member of the present invention.

FIG. 10 is a longitudinal cross-sectional view of the release member of the present invention, taken generally along line 10-10 of FIG. 9.

FIG. 11 is a longitudinal cross-sectional view similar to that of FIG. 10, but taken along line 11-11 of FIG. 9.

DETAILED DESCRIPTION OF THE PREFERRED EMBODIMENTS

FIGS. 1 through 11 illustrate various exemplary embodiments of the present invention in quick-connect fitting assemblies for releasably connecting a pair of cylindrical fluid conduits in fluid communication with one another. As will become apparent to one skilled in the art from the following discussion, the principles employed in the illustrated embodiments of the quick-connect fitting assembly of the present invention are also applicable to fluid systems and fluid conduits of shapes, configurations or types other than those shown for purposes of illustration in the drawings.

Referring primarily to FIGS. 1 through 4, a preferred quick-connect fitting or coupling assembly 10 is provided in accordance with the present invention for releasably connecting a first fluid conduit 12 and a second fluid conduit 14 in fluid communication with one another.

The second fluid conduit 14, which preferably includes a generally laterally-extending protuberance 20, is longitudinally insertable into a socket member or assembly 26 that is either integrally formed on the first fluid conduit 12 or sealingly secured thereto. The socket member or assembly 26 includes a preferred resilient latch clip or retainer member 30 disposed therein and having one or more resilient retainer fingers 32 or barbs 32, which extend inwardly in a generally longitudinal and lateral direction, and one or more resilient locking fingers 33 circumferentially disposed between the fingers 32 and extending longitudinally within the socket member 26. The locking fingers 33 and the retainer fingers 32 are preferably interconnected by a collar portion 31, disposed generally at the outer end of the retainer member 30. The collar portion 31 serves to laterally align and support the fingers 32 within the socket member 26, as well as laterally supporting the second fluid conduit 14, as is described in more detail below.

As perhaps best seen in FIGS. 3 and 4, the socket member 26 preferably includes one or more openings 27 extending laterally through its lateral side. Correspondingly, the locking fingers 33 of the retainer member 30 include tab portions 35 thereon, which protrude laterally outwardly such that the locking fingers 33 laterally resiliently bias the tab portions 35 into a releasable, longitudinally interlocking engagement with the socket member 26 caused by the tab portions 35 being releasably received within the openings 27 of the socket member 26.

Thus, during installation into the fitting assembly 10, the retainer member 30 is slidably inserted within the socket member 26, and the locking fingers 33 with their tab portions 35 are resiliently snapped into interlocking engagement with the openings 27 when the retainer member 30 is fully inserted into the socket member 26. The retainer member 30 can correspondingly be removed from within the socket member 26 by pushing the resilient locking fingers 33 and tab portions 35 laterally inwardly until the tab portion 35 are withdrawn from the openings 27 in the socket member 26. It should be noted, however, that when the second fluid conduit 14 is fully inserted within the socket member 26 and within the retainer member 30, the protuberance 20 is laterally and abuttingly engaged by the tab portions 35 in order to substantially prevent disengagement and removal of the retainer member 30 from within the socket member 26. In addition, the retainer member 30 serves to longitudinally interlock the components of the fitting assembly 10 together by way of laterally-extending and generally flat surfaces 37 on the tab portions 35, which face generally longitudinally outwardly. The flat surfaces 37 releasably and longitudinally engage the socket member 26 by way of the tab portions 35 being received within the lateral openings 27.

In addition to the above, the fitting assembly 10 also includes a release member 80, which is slidably insertable within the retainer member 30 in a generally surrounding relationship with the second fluid conduit 14, as is perhaps best shown in FIGS. 2 through 4. Preferably, the release member 80 includes a collar portion, or at least a partial collar portion, designated by reference numeral 81, which interacts with the collar portion 31 of the retainer member 30 in order to provide lateral support for the second fluid conduit 14 at a longitudinal position outward of that of the protuberance 20.

As is shown for purposes of illustration in the drawings, the release member 80 also preferably includes a groove 82 in its lateral side, extending generally circumferentially therearound. Correspondingly, the retainer member 30 preferably includes a bead portion 39 on its lateral inward side of the retainer fingers 32, which is adapted to be mutually engageable and disengageable with the groove 82 in the release member 80 in a releasable, snap-in and snap-out relationship, respectively, in order to releasably and selectively longitudinally interlock the release member 80 and the retainer member 30 with one another. Although the drawings show the bead portion 39 on the retainer member 30 and the groove 82 on the release member 80, it will be readily recognized that the bead portion can be on the release member, and the groove can be on the retainer member, if desired as an alternate construction.

When the release member 80 is snapped out of engagement with the retainer member 30 and urged longitudinally inwardly within the socket member 26, an inner end 83 of the release member 80 engages the resilient retainer fingers 32 and urges them laterally outwardly, out of their retaining engagement with the protuberance 20 on the second fluid conduit 14. This allows removal of the second fluid conduit 14 from the fitting assembly 10, without the need for removal of the retainer member 30. As mentioned above, however, once the second fluid conduit 14 has been withdrawn from the socket member 26, the tab portions 35 can be laterally urged inwardly to resiliently deflect the locking fingers 33, thereby allowing removal of the retainer member 30 from the socket member 26. In this regard, it should be noted that the tab portions 35 are preferably tapered in a longitudinally and laterally inward direction in order to facilitate the ease of insertion or re-insertion of the retainer member 30 into the socket member 26.

Although the release emmber 80 can be urged longitudinally inwardly, as shown in FIG. 4, by pushing longitudinally inwardly with a screw driver or other suitable tool, a release tool, designated by reference numeral 90 in FIGS. 3 and 4, which generally surrounds or snaps onto the second fluid conduit 14, can also be used to urge the release member 80 longitudinally inwardly. Such release tool 90 can be a separate item, as shown in FIGS. 3 and 4, or alternatively the release tool 90 can be integrally formed with the release member 80.

When the second fluid conduit 14 is longitudinally inserted into the socket member 26 as shown in FIG. 4, the protuberance 20 engages the resilient retainer fingers 32, causing them to resiliently deflect in a generally outward direction as the protuberance 20 passes longitudinally thereby. Once the protuberance 20 longitudinally passes and clears the retainer fingers 32, the retainer fingers 32 resiliently retract or snap inwardly into a longitudinally interlocking engagement with the protuberance 20. Thus, in its fully inserted position, the protuberaqnce 20 on the second fluid conduit 14 is longitudinally restrained between the retainer barb or finger members 32 and a seal retainer or stop member 36, which is disposed in a retaining and abutting engagement with a stepped portion 38 of the socket member 26. One or more sealing members, such as sealing members 42 and 44, are sealingly compressed between the inner surface of the socket member 26 and the outer surface of the second fluid conduit 14 in order to provide fluid sealing between the first and second fluid conduits 12 and 14, respectively.

In addition, the interaction between the locking fingers 33 and the socket member 26, as well as the long length of the locking fingers 33 relative to the overall socket portion, tend to "anchor" the retainer member 30 so as to allow for easy deflection of the retainer finger members 32. The relatively long longitudinal length of the retainer members 32 also allows the conduit 14 to travel a substantial length into the socket during insertion before encountering substantial resistance, thus aiding in the ease of insertion.

Preferably, the sealing members 42 and 44, are separated and maintained in their proper positions by an inner collar member or spacer 48 and are longitudinally retained within the socket member 26 between the seal retainer or stop member 36 and a stepped portion 50 of the socket member 26. A reduced diameter portion 54 of the socket member 26 also provides lateral support for the second fluid conduit 14 at a longitudinal position generally adjacent its inner end, thereby strengthening the interconnection. Although a large amount of such inner lateral support is provided by the reduced diameter portion 54, the inner collar member 48 and seal retainer or stop member 36 also contribute somewhat to the lateral support of the second fluid conduit 14.

The retainer member 30 preferably also includes one or more generally wedge-shaped openings 49 formed in its collar portion 31 generally adjacent its longitudinally outward end. Correspondingly, the release member 80 preferably includes one or more complementary wedge-shaped protuberances 85 forming its collar portion 81. The protuberances 85 are received within the openings 49 when the release member 80 is inserted within the retainer member 30 in order to circumferentially interlock the release member 80 with the retainer member 30, and this arrangement also contributes to the above-mentioned lateral support of the second fluid conduit 14 provided by the interaction of the retainer member 30 and the release member 80.

In this regard it should be emphasized that the collar portion 31 of the retainer member 30 is positioned laterally within the socket member 26 at a longitudinal position generally surrounding the release member 80 and the second fluid conduit 14 so that the collar portions 31 and 81 provide lateral support for the second fluid conduit 14 generally at or near the longitudinally outer end of the socket member 26. This lateral support, coupled with the above-mentioned lateral support provided by the reduced diameter portion 54 of the socket member 26, the spacer member 48, and the stop member 36 at the opposite longitudinal end of the socket member 26, provide improved strength and stability of the connection between the first and second fluid conduits 12 and 14 over that provided by many prior art quick-connect fluid assemblies. Such strength and stability also contribute greatly to substantially preventing leakage between the first and second fluid conduits 12 and 14. In addition to providing such lateral support, the collar portions 31 and 81 cooperate with the socket member 26 to effectively serve as a "dust cap" for substantially preventing the entry of dust or other foreign material into the socket member 26.

During initial assembly of the quick-connect fitting or coupling assembly 10, the sealing member 42 and 44, as well as the spacer member 48, are first inserted into the socket member 26 and retained therein by the seal retainer or stop member 36. Next, the latch clip or retainer member 30, which is preferably a molded synthetic material, is inserted into the socket member 26 in a longitudinal and lateral engagement with the seal retainer or stop member 36. The second fluid conduit 14 is then inserted into the socket member 26, and the release member 80 is then snapped into the retainer member 30 to complete the assembly. At this point, the quick-connect fitting assembly 10 is ready for use or for subsequent disconnection of the first and second fluid conduits 12 and 14, respectively.

During disconnection of the second fluid conduit 14 from the socket member 26 and the first fluid conduit 12, the release member 80 is urged longitudinally inwardly to resiliently deflect the retainer fingers 32, which allows the second fluid conduit 14 to be removed from the socket member 26. Alternately, once the second fluid conduit 14 has been removed, the retainer member 30 can also be removed from the socket member 26, or the retainer member 30 can be left in place in the socket member 26, thus allowing for a very quick and convenient subsequent reconnection of the fluid conduits 12 and 14. This greatly facilitates assembly and disassembly of the fitting assembly 10 in confined areas, or where access to the second fluid conduit is restricted.

The foregoing discussion discloses and describes exemplary embodiments of the present invention. One skilled in the art will readily recognize from such discussion, and from the accompanying drawings and claims, that various changes, modifications, and variations may be made therein without departing from the spirit and scope of the invention as defined in the following claims.

What is claimed is:

1. A quick-connect fitting assembly for releasably connecting a pair of fluid conduits to one another for fluid communication therebetween, said quick-connect fitting assembly comprising:

socket means on a first of the fluid conduits for receiving a second of said fluid conduits inserted longitudinally inwardly into said socket means, said second fluid conduit having a laterally-extending protuberance thereon, and said socket means having at least one opening extending laterally through a lateral side thereof;

retainer means releasably insertable within said socket means for releasably retaining said second fluid conduit within said socket means, said retainer means including at least one resilient retainer finger member disposed within said socket means and being resiliently deflectable into a releasable longitudinally interlocking engagement with said protuberance on said second fluid conduit when said second fluid conduit is fully inserted into said socket means, said retainer means further including at least one resilient locking finger member disposed within said socket means, said resilient locking finger member having a laterally outwardly-protruding tab portion thereon and being laterally resiliently biased into a releasable longitudinally interlocking engagement between said socket means and said retainer means with said tab portion being releasably received in said laterally-extending opening in said socket means, said resilient locking finger member also being selectively resiliently deflectable laterally inwardly in order to selectively disengage said tab portion from within said laterally-extending opening in said socket means and to disengage said retainer means from said longitudinal nterlocking engagement with said socket means;

lateral support means for laterally supporting said second fluid conduit relative to said socket means at longitudinal position outward of said first protuberance; and release means insertable within said socket means and being selectively engageable with said resilient retainer finger member on said retainer means for selectively resiliently deflecting said resilient retainer finger member out of said interlocking engagement with said protuberance on said second fluid conduit in order to allow said second fluid conduit to be withdrawn from said socket means, said release means being releasably and slidably insertable in said longitudinal direction within said retainer means, one of said release means and said retainer means having a bead portion thereon, the other of said release means and said retainer means having a groove portion therein, said bead portion and said groove portion being mutually engageable and disengageable with one another in a releasable snap-in and snap-out relationship, respectively, in order to releasably and selectively longitudinally interlock said release means and said retainer means with one another.

2. A quick-connect fitting assembly according to claim 1, wherein said release means is disposed in a laterally supporting engagement with said retainer means within said socket means.

3. A quick-connect fitting assembly according to claim 2, wherein said lateral support means further includes a collar portion of said release means and a collar portion of said retainer means, said release means collar portion being disposed between said second fluid conduit and said retainer means collar portion at a longitudinal location generally surrounding said second fluid conduit.

4. A quick-connect fitting assembly according to claim 1, further including stop means for limiting the longitudinal insertion of said retainer means within said socket member, said stop means including a stop member within said socket means, said locking finger member on said retainer means being engageable in a longitudinally abutting engagement with said stop member.

5. A quick-connect fitting assembly according to claim 1, further including means for releasably longitudinally interlocking said release means with said retainer means.

6. A quick-connect fitting assembly according to claim 1, further including means for releasably circumferentially interlocking said release means with said retainer means.

7. A quick-connect fitting assembly for releasably connecting a pair of fluid conduits to one another for fluid communication therebetween, said quick-connect fitting assembly comprising:

socket means on a first of the fluid conduits for receiving a second of said fluid conduits inserted longitudinally inwardly into said socket means, said second fluid conduit having a laterally extending protuberance thereon, and said socket means having at least one opening extending laterally through a lateral side thereof;

retainer means releasably insertable with said socket means for releasably retaining said second fluid conduit within said socket means, said retainer means including at least one resilient retainer finger member disposed within sid socket means and being resiliently deflectable into a releasable longitudinally interlocking engagement with said protuberance on said second fluid conduit when said second fluid conduit is fully inserted into said socket means, said retainer means further including at least one resilient locking finger member disposed within said socket means, said resilient locking finger member having a laterally outwardly-protruding tab portion thereon and being laterally resiliently biased into a releasable longitudinally interlocking engagement between said socket means and said retainer means with said tab portion being releasably received in said laterally-extending opening in said socket means, said resilient locking finger member also being selectively resiliently deflectable laterally inwardly in order to selectively disengage said tab portion from within said laterally-extending opening in said socket means and to disengage said retainer means from said longitudinal interlocking engagement with said socket means;

lateral support means for laterally supporting said second fluid conduit relative to said socket means at longitudinal position outward of said first protuberance; and release means insertable within said socket means and being selectively engageable with said resilient retainer finger member on said retainer means for selectively resiliently deflecting said resilient retainer finger member out of said interlocking engagement with said protuberance on said second fluid conduit in order to allow said second fluid conduit to be withdrawn from said socket means, said release means being releasably and slidably insertable in said longitudinal direction within said retainer means, one of said release means and said retainer means having at least one laterally-extending and generally wedge-shaped opening therein, the other of said release means and said retainer means having at least one laterally-extending and generally wedge-shaped protuberance thereon, said wedge-shaped protuberance being longitudinally slidably receivable within said wedge-shaped opening in order to releasably and selectively cirumferentially interlock said release means and said retainer means with one another.

8. A quick-connect fitting assembly according to claim 1, wherein said tab portion on said resilient locking finger member is tapered laterally inwardly and longitudinally inwardly in order to facilitate the insertion of said retainer means into said socket means.

9. A quick-connect fitting assembly according to claim 8, wherein said tab portion on said resilient locking finger member has a laterally-extending and generally flat surface facing generally longitudinally outwardly on a longitudinally outer side thereof, said generally flat surface being adapted for releasable longitudinal engagement with said socket means when said tab portion is releasably received within said laterally-extending opening in said socket means.

10. A quick-connect fitting assembly for releasably connecting a pair of fluid conduits to one another for fluid communication therebetween, said quick-connect fitting assembly comprising:

socket means on a first of the fluid conduits for receiving a second of said fluid conduits inserted longitudinally inwardly into said socket means, said second fluid conduit having a laterally extending protuberance thereon, and said socket means having at least one opening extending laterally through a lateral side thereof;

retainer means releasably insertable within said socket means for releasably retaining said second fluid conduit within said socket means, said retainer means including at least one resilient retainer finger member disposed within said socket means and being resiliently deflectable into a releasable longitudinally interlocking engagement with said protuberance on said second fluid conduit when said second fluid conduit is fully inserted into said socket means, said retainer means further including at least one resilient locking finger member disposed within said socket means, said resilient locking finger member having a laterally outwardly-protruding tab portion thereon and being laterally resiliently biased into a releasable longitudinally interlocking engagement between said socket means and said retainer means with said tab portion being releasably received in said laterally-extending opening in said socket means, said resilient locking finger member also being selectively resiliently deflectable laterally inwardly in order to selectively disengage said tab portion from within said laterally-extending opening in said socket means and to disengage said retainer means from said longitudinal interlocking engagement with said socket means, a portion of said resilient locking finger member laterally abutting said protuberance on said second fluid conduit when said retainer means is fully inserted within said socket means and said second fluid conduit is fully inserted into said socket means in order to substantially prevent said selective disengagement of said tab portion of said resilient locking finger member from said lateral opening in said socket member while said second fluid conduit is fully inserted into said socket means;

lateral support means for laterally supporting said second fluid conduit relative to said socket means at longitudinal position outward of said first protuberance; and release means insertable within said socket means and being selectively engageable with said resilient retainer finger member on said retainer means for selectively resiliently deflecting said resilient retainer finger member out of said interlocking engagement with said protuberance on said second fluid conduit in order to allow said second fluid conduit to be withdrawn from said socket means.

11. A quick-connect fitting assembly according to claim 10 wherein said tab portion of said resilient locking finger member includes a stop portion protruding generally laterally-inwardly therefrom in a laterally abutting engagement with said protuberance on said second fluid conduit in order to substantially prevent said selective disengagement of said tab portion from said lateral opening in said socket member while said second fluid conduit is fully inserted into said socket means.

12. A quick-connect fitting assembly for releasably connecting a pair of fluid conduits to one another for fluid communication therebetween, said quick-connect fitting assembly comprising:

socket means on a first of the fluid conduits for receiving a second of said fluid conduits inserted longitudinally inwardly into said socket means, said second fluid conduit having a laterally-extending protuberance thereon, said socket means having at least one opening extending laterally through a lateral side thereof;

retainer means releasably insertable within said socket means for releasably retaining said second fluid conduit within said socket means, said retainer means including at least one resilient retainer finger member disposed within said socket means and being resiliently deflectable into a releasable longitudinally interlocking engagement with said protuberance on said second fluid conduit when said second fluid conduit is fully inserted into said socket means, said retainer means further including at least one or more resilient locking finger member disposed within said socket means, said resilient locking finger member having a laterally outwardly-protruding tab portion thereon and being laterally resiliently biased into a releasable longitudinally interlocking engagement between said socket means and said retainer means with said tab portion being releasably received in said laterally-extending opening in said socket means, said resilient locking finger member also being selectively resiliently deflectable laterally inwardly in order to selectively disengage said tab portion from within said laterally-extending opening in said socket means and to disengage said retainer means from said longitudinal interlocking engagement with said socket means, a portion of said resilient locking finger member laterally abutting said protuberance on said second fluid conduit when said retainer means is fully inserted within said socket means and said second fluid conduit is fully inserted into said socket means in order to substantially prevent said selective disengagement of said tab portion of said resilient locking finger member from said lateral opening in said socket member while said second fluid conduit is fully inserted into said socket means; and release means releasably and slidably insertable within said retainer means and being selectively engageable with said resilient retainer finger member on said retainer means for selectively resiliently deflecting said resilient retainer finger member out of said interlocking engagement with said first protuberance on said second fluid conduit in order to allow said second fluid conduit to be withdrawn from said socket means.

13. A quick-connect fitting assembly for releasably connecting a pair of fluid conduits to one another for fluid communication therebetween, said quick-connect fitting assembly comprising:

socket means on a first of the fluid conduits for receiving a second of said fluid conduits inserted longitudinally inwardly into said socket means, said second fluid conduit having a laterally-extending protuberance thereon, said socket means having at least one opening extending laterally through a lateral side thereof;

retainer means releasably insertable within said socket means for releasably retaining said second fluid conduit within said socket means, said retainer means including at least one resilient retainer finger member disposed within said socket means and being resiliently deflectable into a releasable longitudinally interlocking engagement with said protuberance on said second fluid conduit when said second fluid conduit is fully inserted into said socket means, said retainer means further including at least one or more resilient locking finger members disposed within said socket means, said resilient locking finger member having a laterally outwardly-protruding tab portion thereon and being laterally resiliently biased into a releasable longitudinally interlocking engagement between said socket means and said retainer means with said tab portion being releasably received in said opening in said socket means, said resilient locking finger member also being selectively resiliently deflectable laterally inwardly in order to selectively disengage said tab portion from within said laterally-extending opening in said socket means and to disengage said retainer means from said longitudinal interlocking engagement with said socket means, a portion of said resilient locking finger member laterally abutting said protuberance on said second fluid conduit when said retainer means is fully inserted within said socket means and said second fluid conduit is fully inserted into said socket means in order to substantially prevent said selective disengagement of said tab portion of said resilient locking finger member from said lateral opening in said socket member while said second fluid conduit is fully inserted into said socket means; and release means releasably and slidably insertable within said retainer means and being selectively engageable with said resilient retainer finger member on said retainer means for selectively resiliently deflecting said resilient retainer finger member out of said interlocking engagement with said first protuberance on said second fluid conduit in order to allow said second fluid conduit to be withdrawn from said socket means, one of said release means and said retainer means having a bead portion thereon, the other of said release means and said retainer means having a groove portion therein, said bead portion and said groove portion being mutually engageable and disengageable with one another in a releasable snap-in and snap-out relationship, respectively, in order to releasably and selectively longitudinally interlock said release means and said retainer means with one another.

14. A quick-connect fitting assembly for releasably connecting a pair of fluid conduits to one another for fluid communication therebetween, said quick-connect fitting assembly comprising:

socket means on a first of the fluid conduits for receiving a second of said fluid conduits inserted longitudinally inwardly into said socket means, said second fluid conduit having a laterally-extending protuberance thereon, said socket means having at least one opening extending laterally through a lateral side thereof;

retainer means releasably insertable within said socket means for releasably retaining said second fluid conduit within said socket means, said retainer means including at least one resilient retainer finger member disposed within said socket means and being resiliently deflectable into a releasable longitudinally interlocking engagement with said protuberance on said second fluid conduit when said second fluid conduit is fully inserted into said socket means, said retainer means further including at least one or more resilient locking finger members disposed within said socket means, said resilient locking finger member having a laterally outwardly-protruding tab portion thereon and being laterally resiliently biased into a releasable longitudinally interlocking engagement between said socket means and said retainer means with said tab portion being releasably received in said laterally-extending opening in said socket means, said resilient locking finger member also being selectively resiliently deflectable laterally inwardly in order to selectively disengage said tab portion from within said laterally-extending opening in said socket means and to disengage said retainer means from said longitudinal interlocking engagement with said socket means, a portion of said resilient locking finger member laterally abutting said protuberance on said second fluid conduit when said retainer means is fully inserted within said socket means and said second fluid conduit is fully inserted into said socket means in order to substantially prevent said selective disengagement of said tab portion of said resilient locking finger member from said lateral opening in said socket member while said second fluit conduit is fully inserted into said socket means; and release means releasably and slidably insertable within said retainer means and being selectively engageable with said resilient retainer finger member on said retainer means for selectively resiliently deflecting said resilient retainer finger member out of said second fluid conduit in order to allow said second fluid conduit to be withdrawn from said socket means, one of said release means and said retainer means having at least one laterally-extending extending and generally wedge-shaped opening therein, the other of said release means and said retainer means having at least one laterally-extending and generally wedge-shaped protuberance thereon, said wedge-shaped protuberance being longitudinally slidably receivable within said wedge-shaped opening in order to releasably and selectively circumferentially interlock said release means and said retainer means with one another.

15. A quick-connect fitting assembly according to claim 12, wherein said tab portion on said resilient locking finger member is tapered laterally inwardly and longitudinally inwardly in order to facilitate the insertion of said retainer means into said socket means.

16. A quick-connect fitting assembly according to claim 15, wherein said tab portion on said resilient locking finger member has a laterally-extending and generally flat surface facing generally longitudinally outwardly on a longitudinally outer side thereof, said generally flat surface being adapted for releasable longitudinal engagement with said socket means when said tab portion is releasably received within said laterally-extending opening in said socket means.

17. A quick-connect fitting assembly according to claim 12, wherein said tab portion of said resilient locking finger member includes a stop portion protruding generally laterally-inwardly therefrom in a laterally abutting engagement with said protuberance on said second fluid conduit in order to substantially prevent said selective disengagement of said tab portion from said lateral opening in said socket member while said second fluid conduit is fully inserted into said socket means.

18. A quick-connect fitting assembly for releasably connecting a pair of fluid conduits to one another for fluid communication therebetween, said quick-connect fitting assembly comprising:

socket means on a first of the fluid conduits for receiving a second of said fluid conduits inserted longitudinally inwardly into said socket means, said second fluid conduit having a laterally-extending protuberance thereon, said socket means having at least one opening extending laterally through a lateral side thereof;

retainer means releasably insertable within said socket means for releasably retaining said second fluid conduit within said socket means, said retainer means including at least one resilient retainer finger member disposed within said socket means and being resiliently deflectable into a releasable longitudinally interlocking engagement with said protuberance on said second fluid conduit when said second fluid conduit is fully inserted into said socket means, said retainer means further including at least one or more resilient locking finger members disposed within said socket means, said resilient locking finger member having a laterally outwardly-protruding tab portion thereon and being laterally resiliently biased into a releasable longitudinally interlocking engagement between said socket means and said retainer means with said tab portion being releasably received in said laterally-extending opening in said socket means, said resilient locking finger member also being selectively resiliently deflectable laterally inwardly in order to selectively disengage said tab portion from within said laterally-extending opening in said socket means and to disengage said retainer means from said longitudinal interlocking engagement with said socket means, a portion of said resilient locking finger member laterally abutting said protuberance on said second fluid conduit when said retainer means is fully inserted within said socket means and said second fluid conduit is fully inserted into said socket means in order to substantially prevent said selective disengagement of said tab portion of said resilient locking finger member from said lateral opening in said socket member while said second fluid conduit is fully inserted into said socket means;

release means releasably and slidably insertable within said retainer means and being selectively engageable with said resilient retainer finger member on said retainer means for selectively resiliently deflecting said resilient retainer finger member out of said second fluid conduit in order to allow said second fluid conduit to be withdrawn from said socket means, and stop means from limiting the longitudinal insertion of said retainer means within said socket member, said stop means including a stop member within said socket means, said locking finger member on said retainer means being engageable in a longitudinally abutting engagement with said stop member.

19. A quick-connect fitting assembly according to claim 12, further including lateral support means for lateraly supporting said second fluid conduit relative to said socket means at a longitudinally outward position relative to said protuberance on said second fluid conduit.

20. A quick-connect fitting assembly according to claim 19, wherein said release means is disposed in a laterally supporting engagement with said retainer means within said socket means.

21. A quick-connect fitting assembly according to claim 20, wherein said lateral support means further includes a collar portion of said release means and a collar portion of said retainer means, said release means collar portion being disposed between said second fluid conduit and said retainer means collar portion at a longitudinal location generally surrounding said second fluid conduit.

* * * * *

UNITED STATES PATENT AND TRADEMARK OFFICE
CERTIFICATE OF CORRECTION

PATENT NO. : 4,834,423

DATED : May 30, 1989

INVENTOR(S) : Daniel L. DeLand

It is certified that error appears in the above-identified patent and that said Letters Patent is hereby corrected as shown below:

Col. 1, line 4, insert "AND SUMMARY" after --BACKGROUND--.

Col. 2, line 66, "poosition" should be --position--.

Col. 3, line 60, "present" should be --prevent--.

Col. 4, line 6, "to" should be --of--.

Col. 4, line 32, insert "the" after --with--.

Col. 5, line 12, insert "." after --invention--.

Col. 6, line 30, "portion" should be --portions--.

Col. 7, line 26, "emmber" should be --member--.

UNITED STATES PATENT AND TRADEMARK OFFICE
CERTIFICATE OF CORRECTION

PATENT NO. : 4,834,423

DATED : May 30, 1989

INVENTOR(S) : Daniel L. DeLand

It is certified that error appears in the above-identified patent and that said Letters Patent is hereby corrected as shown below:

Col. 7, Line 46, "protuberaqnce" should be --protuberance--.

Col. 8, Line 43, "preventing" should be --prevent--.

Col. 9, Line 55, Claim 1, "nterlocking" should be --interlocking--.

Col. 10, Line 51, Claim 7, "with" should be --within--.

Col. 10, Line 55, Claim 7, "sid" should be --said--.

Col. 11, Line 32, Claim 7, "cirumferentially" should be --circumferentially--.

UNITED STATES PATENT AND TRADEMARK OFFICE
CERTIFICATE OF CORRECTION

PATENT NO. : 4,834,423

DATED : May 30, 1989

INVENTOR(S) : Daniel L. DeLand

Page 3 of 3

It is certified that error appears in the above-identified patent and that said Letters Patent is hereby corrected as shown below:

Col. 13, Line 65, Claim 13, insert "laterally-extending" before --opening--.

Col. 15, Line 11, Claim 14, "fluit" should be --fluid--.

Col. 16, Line 43, Claim 18, "from" should be --for--.

Fig. 4 of the drawings. The clip is incorrectly identified as 80; should be identified as 30;

The prior art references cited on Form PTO-1449, filed April 19, 1988 (see attached) were ommitted from the official patent document.

Signed and Sealed this

Third Day of March, 1992

*Attest:*

HARRY F. MANBECK, JR.

*Attesting Officer*     *Commissioner of Patents and Trademarks*